Figure 3:
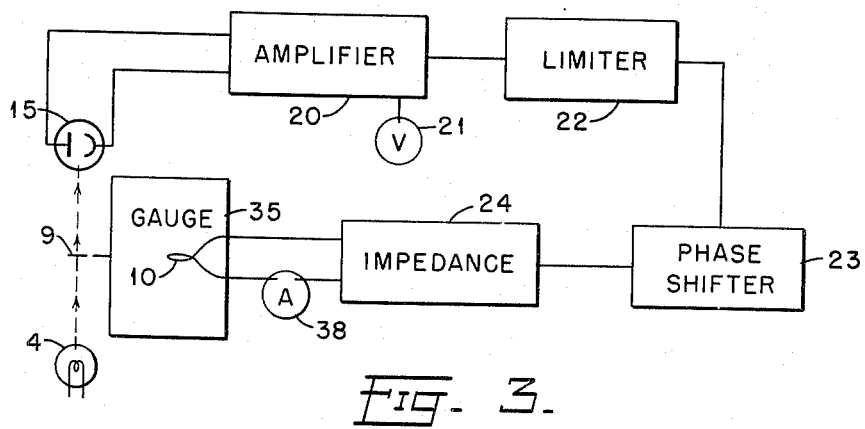

Feb. 5, 1957    G. A. KUIPERS    2,780,099
VACUUM GAUGE
Filed Oct. 31, 1955    2 Sheets-Sheet 1
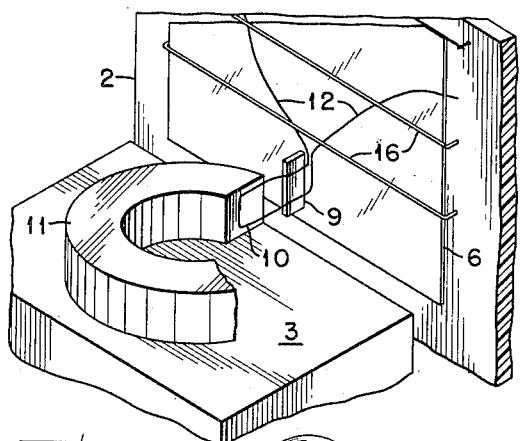
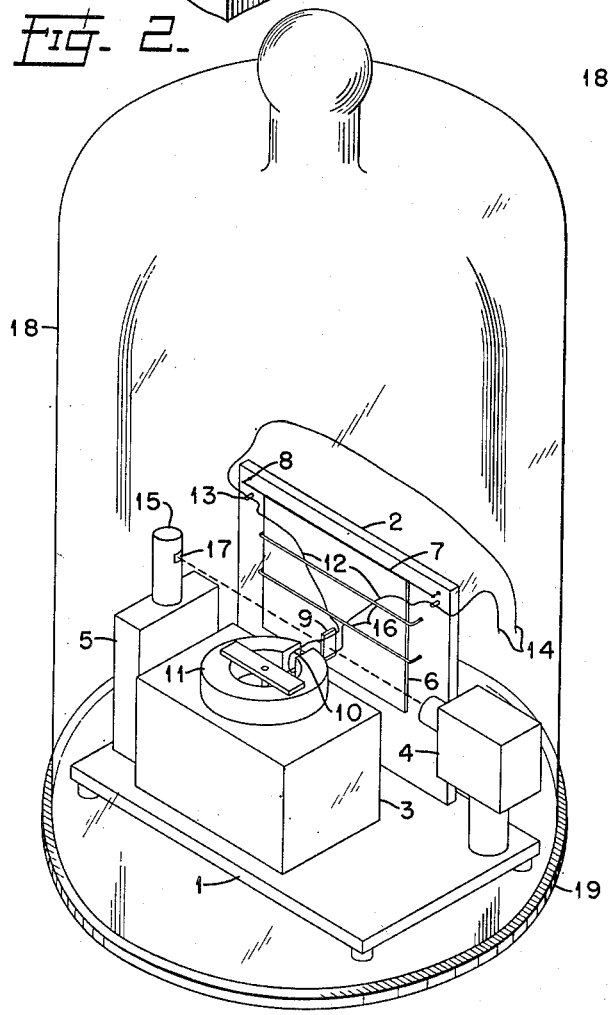
INVENTOR.
BY George A. Kuipers
ATTORNEY Feb. 5, 1957    G. A. KUIPERS    2,780,099
VACUUM GAUGE
Filed Oct. 31, 1955    2 Sheets-Sheet 2

INVENTOR.
BY George A. Kuipers
Roland A. Anderson
ATTORNEY

United States Patent Office 2,780,099
Patented Feb. 5, 1957

2,780,099

VACUUM GAUGE

George A. Kuipers, Oak Ridge, Tenn., assignor to the United States of America as represented by the United States Atomic Energy Commission Application October 31, 1955, Serial No. 544,097

10 Claims. (Cl. 73—388)

This invention relates to vacuum measuring devices or gauges, and more particularly to a movable vane type of arrangement for the direct measurement of a wide range of subatmospheric pressures, and is related in some respects to my prior Patent #2,552,895, granted May 15, 1951.

In the prior art various arrangements have been used to determine the degree of vacuum. Some of these rely upon the measurement of some physical property of the gases in the system where the vacuum is to be determined. Others are made to respond directly, utilizing the principles of the gas laws.

In one arrangement, a movable type of vane is enclosed in a casing in communication with the vacuum source whose pressure is to be measured. Also rotatably mounted within the casing in spaced relation to the indicating vane, is a pivoted paddle type of driving vane. Power is applied to oscillate the driving vane through alternate compression and expansion of the gas molecules on either face of the indicating vane, causing the indicating vane to oscillate in synchronism with the driving vane. For low pressures, fewer molecules are available in the spaces between the driving vane and indicating vane for compression during operation, and the indicating vane swings with a relatively small amplitude. However, when measuring higher pressures more molecules are found in the spaces and compression of this greater number of molecules results in increasing the amplitude of swing of the indicating vane. By calibrating the amplitude of swing of the indicating vane during its oscillations, a measure of the vacuum can be obtained. In operation, a frequency is chosen for the paddle or driving vane which corresponds to the resonant frequency of the indicating vane at zero amplitude, but if the indicating vane is not swinging, pressure cannot be measured with it. Then to measure pressure the indicating vane must be driven to a small fixed amplitude. As soon as this occurs the indicating vane is no longer being driven on the selected resonant frequency. Then there must be a certain minimum gas pressure within the gauge housing to permit driving the indicating vane off resonance. The choice of a fixed amplitude for the measurement of the indicating vane fixes the minimum pressure where the gauge may be operated or determines the lower pressure limit. Practical considerations place a limitation on the minimum amplitude which may be chosen, without encountering vibration problems. This arrangement requires a mechanical structure of substantial size, and friction in the bearings for mounting the indicating vane, limits sensitivity. Accordingly, the device operates with greater sensitivity at lower amplitudes of swing of the indicating vane. Other limiting factors include close spacing tolerances between the moving vanes and the enclosing walls of the casing to avoid excessive gas diffusion from one zone to the other in the gauge.

Applicant with a knowledge of the problems of the prior art has for an object of his invention the provision of a pressure measuring device for accurately measuring a wide range of sub-atmospheric pressures.

Applicant has as another object of his invention the provision of a versatile arrangement for directly measuring the pressure over a wide range and adapted for use with both condensible or non-condensible gases, including gases susceptible to thermal decomposition.

Applicant has as another object of his invention the provision of a gauge which operates on the principle that a vane can be made to oscillate within a chamber in such a manner that the energy expended is related to the pressure prevailing in the chamber.

Applicant has as another object of his invention the provision of a sensitive pressure measuring device of the oscillating vane type wherein power for driving the indicating vane is applied directly thereto and the necessity for a minimum gas cushion, which limits sensitivity, is avoided.

Applicant has as a further object of his invention the provision of a device for measuring pressure of the swinging vane type wherein friction is not a limitation on sensitivity at the higher amplitudes of swing of the vane.

Applicant has as a still further object of his invention the provision of a pressure measuring device of the oscillating vane type wherein damping of the movement of the vane is accomplished between the vane and a fixed wall, and is utilized as a function of pressure to obtain measurements thereof.

Applicant has as a still further object of his invention the provision of a pressure measuring device of the damped oscillating vane type wherein damping is accomplished between the vane and a wall that moves in synchronism with the vane to overcome the effects of vibration.

Other objects and advantages of my invention will appear from the following specification and accompanying drawings, and the novel features thereof will be particularly pointed out in the annexed claims.

Figure 5:
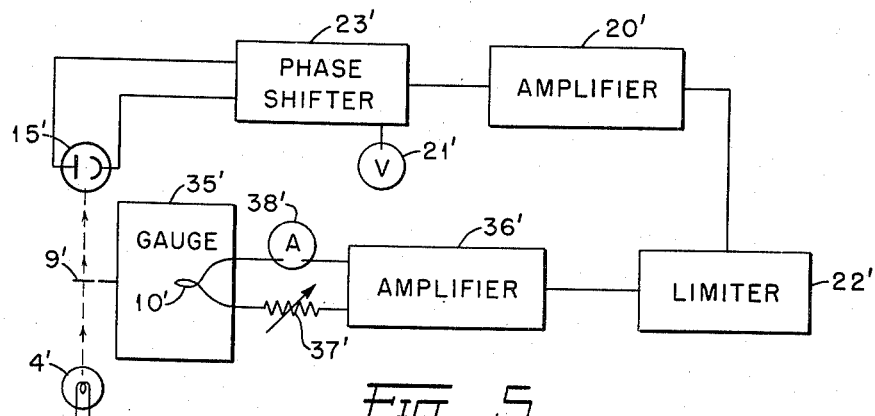
Figure 6:
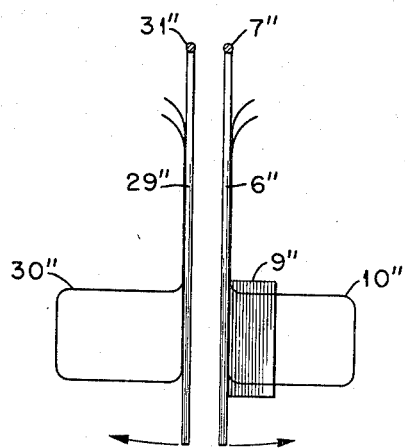
Figure 7:
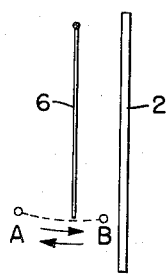

In the drawings, Figure 1 is a perspective of a portion of my improved system with the pressure sensitive and other portions enclosed in a bell jar. Figure 2 is a fragmental perspective showing the relation of the moving vane, wire loop, and magnet of my improved pressure measuring gauge. Figure 3 is a block diagram of one form of system incorporating my improved vacuum gauge. Figure 4 is an elevation of one form of my improved vacuum measuring device having the pressure sensitive portions enclosed in an envelope. Figure 5 is a block diagram of a modified system for use with my improved vacuum gauge. Figure 6 is an end elevation of a pair of moving vanes for cooperation in producing damping in a modified form of my improved vacuum gauge. Figure 7 is a schematic of the moving vane and wall showing the general relation of these elements during operation of my improved vacuum gauge, but with the spacing slightly exaggerated.

Referring to the drawings in detail, Figure 1 is an illustrated embodiment of applicant's improved vacuum measuring device having certain portions enclosed within a bell jar 18. The bell jar may be of conventional type and is provided with a leak tight bottom or end closure 19. The closure 19 may include appropriate conventional means (not shown) for communication with a source of vacuum to be measured. It may likewise be provided with electrical leads or connections (not shown) which pass therethrough in leak tight relation for providing electrical conductivity between equipment in the bell jar and that located externally thereof.

In this embodiment, the vacuum gauge includes a rigid base plate 1, to which the following components are rigidly assembled: a vertically-extending wall member 2; a magnet-supporting block 3; a light projector 4; and a photocell assembly 5. As shown, a very thin, sheet-like vane 6 is attached along its upper edge portion to a face of the wall member 2, so as to be movable in a direction normal to the plane of the vane. The vane 6 is preferably a thin rigid sheet but may be a flexible sheet such as mica, since a certain amount of flexibility may be tolerated to broaden the scope of suitable materials. This sheet is mounted very closely adjacent to, but not in contact with, the face of the wall 2 when at "zero" (i. e., when subject only to gravitational forces). The vane 6 can be mounted in a variety of ways, as by means of conventional pivots at the upper extremities of its end edges (not shown) or by securing its upper edge portion to a threadlike support 7 stretched between two horizontally-aligned pins 8 on the face of the wall 2, or in any other suitable manner. For convenience, suitable means are provided for limiting outward swing of the vane 6; these may comprise one or more horizontally-disposed guard wires 16 which bridge the vane 6 and whose ends are secured to the wall 2.

Referring to Figures 1 and 2, a light-interrupter, or shutter 9 is rigidly secured along one of its edges to the outer face of the vane 6 and projects therefrom. The shutter 9 is composed of an opaque material, such as silvered mica; preferably, it is positioned at the midpoint of the lower edge portion of the vane 6. As shown, a generally U-shaped loop of wire 10 is secured to the shutter 9 and extends outward therefrom. With the vane 6 at zero position, the base or outermost portion of the loop lies in a vertical plane. The base of the loop is disposed in the magnetic field between the poles of a horizontally-disposed horseshoe magnet 11. As shown, the magnet 11 is rigidly-mounted to the aforementioned support block 3.

Continuations 12 of the side portions of the wire loop 10 extend from the shutter 9, and across the face of the vane 6, to support posts 13. The latter are mounted on the wall member 2. The continuations 12 are bonded or otherwise secured to the vane 6, and are disposed symmetrically on either side of its vertical axis to distribute their weight uniformly. At the posts 13 the continuations 12 are joined to suitable leads 14; these are connected to the output terminals of an external electronic pulser or into a control circuit to be described more in detail hereinafter.

As shown in Figures 1 and 2, the projector or light source 4 and the photocell assembly 5 are positioned on opposite sides of the shutter 9, at distances permitting free swinging of the vane 6. The projector or light source 4 is provided with a suitable power supply (not shown), and generates a beam of light which is intercepted in part by the shutter 9 when the vane 6 is at zero. Referring to the photocell assembly 5, the photocell is enclosed by an opaque hood 15 provided with a small aperture 17. The aperture 17 is in registration with the aforementioned beam of light and with the cathode of the photocell. With the vane 6 at zero position, the shutter 9 masks an edgewise portion of the aperture 17. Consequently, oscillation of the vane 6 about its zero position will vary the amount of light impinging on the cathode of the photocell, thus generating an electrical signal having the same frequency of oscillation as the vane 6.

A signal from the photoelectric cell 15 is fed to amplifier 20, shown in Figure 3, which may be of conventional type, and drives an integrator 21 which may take the form of a voltmeter, so that the lower the pressure the greater the swing of the vane 6, and the greater the signal from the photoelectric cell the larger the meter reading, thereby giving an indication of the magnitude of the pressure which bears an inverse relation to the magnitude of the voltmeter reading. The output of the amplifier 20 is also fed into a limiter 22 of any suitable type, such as an amplifier that saturates on signals above a predetermined value, or a univibrator that produces rectangular pulses of substantially the same magnitude, and which are independent of the magnitude of the input signal fed into it, but are of the same frequency as the input signal. The output signal from the limiter 22 is fed to a phase shifter 23 of conventional type such as an R. C. network which automatically adjusts the phase of the signal from the limiter relative to the position of the vane. The phase shifter then feeds the signal through an appropriate impedance 24 to the loop or coil 10 of the vacuum gauge, so that the magnitude of the control signal may be adjusted as desired. This signal provides the driving current for the loop or coil 10 in the manner described more in detail hereinafter.

In the foregoing structure it is apparent that the introduction of a wall 2 in close proximity to the vane 6 produces a damping effect as the molecules of the gas are compressed in the small space between the vane and the wall. The vane is preferably of large area and being positioned in close proximity to the wall, limits diffusion of the gas molecules into and out of the space as the vane swings in its pendulum like motion, producing the optimum damping effect. It has been found that with a given geometry, damping is proportional to pressure within the bell jar 18. Power input to maintain a given amplitude of swing of the vane is also proportional to damping. Thus the magnitude of the signal measured on the meter 21 is a function of damping, and damping is a function of pressure, so that such meter readings are, in turn, a measure of pressure within the system. This principle is utilized in determining pressure from meter readings.

In a typical operation of the gauge of Fig. 1, the vane 6 is set into oscillation by any suitable mechanical means, such as an externally-controlled striker (not shown) adapted to tap the wall member 2. The vane 6 then oscillates at its natural frequency, generating a signal of like frequency in the photoelectric cell output. The signal from the photoelectric cell is fed into the pulser, where it is amplified. As a result, the integrator in the pulser circuit registers a value proportional to the magnitude of the photoelectric cell signal, and the oscillator generates the aforementioned square wave. The square wave is impressed across the wire loop 10, producing an alternating drive current of substantially uniform magnitude therein. When the drive current is properly phased and the power maintained at substantially a constant level, the electromagnetic field about the loop 10 interacts with the field of the magnet 11 to sustain oscillation of the vane at an amplitude which is inversely proportional to pressure.

The mode of operation may be better understood by a reference to Figure 7 wherein the path of travel of the vane is indicated by A—B. As the vane travels from A to B, movement is resisted by the compression of the molecules between the wall 2 and vane 6. At the end of the swing, as the vane 6 comes to rest momentarily, molecules escape from the space between vane 6 and wall 2. Then as the vane 6 swings from B to A, there are more molecules in the space on the free side of the vane 6 than between the vane 6 and wall 2, so the movement from B to A is resisted. Thus, for a given power input, the greater the pressure, the smaller the swing of the vane, and the meter 21 may be calibrated to read, either directly or from a chart or graph, the pressure in the system.

One suitable method for calibrating the vacuum gauge is to use a conventional electronic ion gauge as a reference. In a typical calibration of the kind, applicant's improved gauge and the conventional ion gauge are mounted in a chamber containing argon, for example, and the chamber is pumped down to a pressure of, say, $1.5\times10^{-4}$ mm. Hg, as indicated by the conventional ion gauge. The vane 6 of applicant's improved gauge then is set into oscillation mechanically, as described, and the phase of the square wave is adjusted manually so that the drive current is timed to oscillate the vane 6 continuously. Following this adjustment, the oscillation of the vane is permitted to come to an equilibrium value, as indicated by a non-fluctuating reading on the integrator. The magnitude of the drive current then is adjusted manually as by a resistor or voltage divider 37' shown in the circuit of Fig. 5, to obtain a preselected reading on the integrator. This preselected "reference" reading is determined empirically prior to calibration; it is the reading produced when the vane 6 is swinging at the particular amplitude for which it was designed. The value of the drive current required to obtain the reference reading is noted on ammeter 38 (or 38'), and this value (e. g., 70 microamps.) is recorded as being equivalent to the aforementioned pressure of $1.5\times10^{-4}$ mm. Hg. The pressure within the chamber then is altered, the drive current again is adjusted (by a resistor 37' or other suitable means) to obtain the reference reading, and the drive current now prevailing (e. g., 24 microamps.) is recorded as being the equivalent of the new pressure (e. g., $6\times10^{-5}$ mm. Hg). This calibration procedure is followed for a wide range of pressures, the drive currents and the corresponding pressures being correlated by means of a chart or graph. A change of pressure does not alter the frequency of oscillation (i. e., the number of times per unit of time that the vane 6 passes through zero); a change in pressure does, however, alter the amplitude of swing, and therefore the magnitude of the output signal from the photocell. The reading of the aforementioned integrator thus corresponds to amplitude. The purpose of readjusting the drive current is to adjust the amplitude of swing to the value used for calibration. If a drive current of, say, 24 ma. is required to obtain the same amplitude of oscillation as was used for calibration, then (other things being constant) the unknown pressure must correspond to the pressure obtaining when 24 ma. was required to drive the vane during calibration.

It will be apparent that in this gauge the input energy (drive current) balances the energy expended by the vane 6 as it oscillates at constant frequency. This expended energy, or damping energy, is in large part expended in collisions with the molecules of the gas in the system. It is preferable that the pressure-dependent component of the damping energy be very large, so that the response time will be short. This objective is accomplished effectively by the novel provision of the wall member 2 in proximity to the vane 6. As the vane 6 approaches the wall 2, a part of the gas therebetween is compressed, or trapped, momentarily. The molecules of this compressed gas by necessity collide many times with the vane 6. Calculations indicate that this action increases the pressure-dependent component of the damping energy of the vane by a factor of about 1000 in the apparatus constructed. It will be apparent that the mounting of the vane should be such as to provide a minimum of friction.

In one preferred embodiment of the invention the vane 6 of the gauge comprised a square sheet of 1.6 mg./cm.$^2$ mica measuring 7 cm. on a side. The loop 10 and the wires 7, 12 and 14 consisted of one-mil tungsten. The magnet 11 provided a field of about 2500 gauss. The vane 6 was designed so that under normal operating conditions its bottom edge swung about 1 mm. on either side of zero position when the vane was oscillated at natural frequency (approximately 6 cycles per second). When swinging, the lower edge of the vane approached within about 1 mm. of the wall. At zero, the shutter 9 overlapped the aperture 17 sufficiently to mask about 10% of the aperture.

The following table, based upon a typical calibration, indicates the relationship of drive current to pressure.

| Drive Current (Microamps, A. C.) | Pressure (mm. Hg, Ion Gauge) |
|---|---|
| 69.0 | $1.5\times10^{-4}$ |
| 23.8 | $6.5\times10^{-5}$ |
| 3.0 | $1.3\times10^{-5}$ |
| 0.9 | $3.5\times10^{-6}$ |

While the shape and size of the vane 6 can be varied considerably, a particularly good vane geometry is one wherein the length and width of the vane are many times larger than (1) the maximum amplitude of swing under normal operating conditions, and (2) the closest-approach distance between the lower edge of the vane and the wall. Preferably, the amplitude of swing (i. e., zero position to maximum) is approximately equal to the closest approach of the vane to the wall. Best operation is obtained when the gauge is mounted so as to keep spurious vibrations at a minimum.

It will be apparent that the construction of my improved gauge can be varied without departing from the principle of the invention. The arrangement shown in Figure 1 is particularly well suited for use at low pressures, where the mean free path of the molecules is large. At pressures approaching atmosphere, where damping is primarily dependent on gas turbulence rather than gas compression, the vane 6 preferably is constructed to have a much smaller area.

The mode of operating the gauge also can be varied from that described. For example, satisfactory operation can be achieved by holding the drive current constant and permitting the amplitude to vary, in which case the integrator reading is the index of pressure. The gauge should be calibrated with the same gas with which it is to be used.

In the modification of Figure 4, the envelope 18' of glass or other suitable material encloses portions of the vacuum measuring device including wall 2' and vane 6', which is pivotally suspended from wall 2' by wire 7'. Shutter 9' mounted centrally of vane 6' carries wire loop 10' disposed within the field to set up in the air gap of horseshoe magnet 11'. To conserve space the magnet 11' is positioned in a vertical plane substantially parallel to wall 2'. The leads 13', 13' from the loop pass out through a glass mash, press, or other airtight seal to equipment located externally of the envelope. The lower portion 25' of the envelope takes the form of a tubular extension which is adapted to communicate through any appropriate connection at its lower end with the source of vacuum to be measured. The upper end is flanged at 26' and is joined to a corresponding flange 27' on the upper portion 28' of the envelope. In this arrangement the light source 4' and the photoelectric cell 7' are located externally of the envelope, but are positioned so that the shutter 9' on the moving vane 6' may intercept or mask a portion of the beam as it oscillates.

In the modification of Figure 6, a pair of moving vanes 6'' and 29'' are used to replace the vane 6 and wall 2 of the arrangement of Figure 1. Each of the vanes 6'', 29'' carries a wire loop which is normally disposed within a magnetic field (not shown) of a type similar to that set up by magnet 11 of Figure 1. However, the loops 10'', 30'' are so connected in series that a current pulse causes the vanes 6'', 29'' to move in opposite directions about their respective pivots 7'', 31''. By employing two swinging vanes, instead of one swinging vane and a stationary wall, it is possible to minimize vibration effects or those resulting from the fact that the instrument is not level, since both vanes are subject to the same conditions, and the effects tend to cancel each other out.

In operation, the shutter 9" carried by vane 6" is adapted to intercept a beam of light extending normal to the plane of the paper. This action alters the light reaching the photoelectric cell (not shown) from the light source (not shown), and the signal fed to the control circuit by the photoelectric cell. As an alternative, the photoelectric cell signal source may be replaced by an arrangement which utilizes the change in capacity between the two vanes as a measure of vane motion. This can be accomplished by coupling the two vanes into a resonant circuit driven at resonance by a suitable oscillator (not shown). A change in capacity between the vanes would appear as a change in the frequency of the oscillator.

In the modification of the control circuit of Figure 5, the photoelectric cell is designated 15' and the light source appears at 4'. The beam of light is masked by a shutter 9' of gauge 35'. Signals from the photoelectric cell 15' feed into a conventional phase shifter 23' and are altered to conform with the movements of the shutter. Meter 21' serves to measure the magnitude of the signal from the phase shifter 23'. The phase shifter 23' also feeds amplifier 20' and the amplified signal therefrom is fed into limiter or univibrator 22' which produces square pulses of uniform magnitude at its output and is independent of the magnitude of the input signal. The output signal from the limiter 22' passes to the amplifier 36' where it is amplified and is fed through variable resistor 37' to a circuit including loop 10' and current meter 38'.

In its operation, the amplitude of the vane is held substantially constant and the drive current is altered by resistor 37'. When the signals from the photoelectric cell 15', controlled by the action of the shutter 9', which masks the light from the source 4', reach the phase shifter 23', their phase is so altered that the force applied to the vane 9', by the interaction of the fields of the magnet and the loop, is always in the same direction as the motion of the vane. Without the phase shifter, the drive current would ordinarily be 90° out of phase with the motion of the vane. As a result, the force applied by the drive current would at times oppose the motion of the vane instead of aiding it. With the phase shifter, the drive current applied an aiding force to the vane during all four quarters of any oscillation of the vane. After adjustment of the phase of the signals, they are amplified in amplifier 20' and fed into limiter 22'. The limiter produces an output signal which is independent of the amplitude of oscillation of the vane. One convenient way to do this is to convert the sine wave signal from amplifier 20' to a square wave by means of a wave shaper such as a univibrator. If the drive current for the vane should be dependent upon the amplitude of oscillation of the vane, the vane would not be stable. However, the wave shape of the vane is not critical, and it may take other forms than the square wave. The output signal of the limiter 22' which is fed to the loop 10' may have its magnitude adjusted with the manual impedance 37'.

Where it is desired to alter the mode of operation by holding the drive current constant, and permitting the amplitude of swing of the vane to vary, the impedance 37' is set to a given value, and the reading of the meter 38' will be proportional to the pressure in the system.

Having thus described my invention, I claim:

1. A pressure measure system comprising a chamber for communication with a source of gas whose pressure is to be measured, means providing a wall disposed within said chamber, a power operated swinging element positioned adjacent the wall for producing a damping effect corresponding to pressure, a circuit responsive to movement of the element for feeding power to said element to maintain the movement thereof against damping, and means for measuring the pressure in said chamber as a function of the power applied to the element to maintain the amplitude of swing.

2. An arrangement for measuring pressure comprising a device for communication with a source of pressure to be measured including an enclosure, a wall disposed therein and a swinging vane positioned adjacent the wall to produce a damping action corresponding to pressure, electromagnetic means for applying power to said vane to sustain its movement, and means for measuring the pressure as a function of damping of said vane.

3. An arrangement for measuring pressure comprising a device for communication with a source of pressure to be measured including an envelope, a stationary wall disposed therein, a swinging wall positioned in close proximity to the stationary wall for providing damping corresponding to pressure in the envelope, electromagnetically operated means for actuating the swinging wall, and means for measuring pressure as a function of power supplied to said actuating means.

4. An arrangement for measuring pressure comprising an envelope for communication with a source of pressure to be measured, a pair of wall elements disposed within the envelope in close proximity to each other, at least one of said elements being movable to produce damping corresponding to pressure in the envelope, electromagnetically operated means for supplying energy for swinging one of said elements, a source of light having a beam extending across the path of travel of the swinging element, and light responsive means for indicating pressure as a function of travel of the element across the beam from said light source.

5. An arrangement for measuring pressure comprising an envelope for communication with a source of pressure to be measured, a stationary and a movable wall disposed in said envelope in close proximity to provide damping during movement corresponding in magnitude to the pressure therein, electromagnetically operated means for actuating the movable wall, a shutter carried by the movable wall, a light source having a beam extending across the path of travel of the shutter, and light sensitive means responsive to light passing the shutter for measuring pressure as a function of damping.

6. An arrangement for measuring pressure comprising an envelope for communication with a source of pressure to be measured, a stationary and a movable wall disposed within the envelope in close proximity to provide damping during movement corresponding in magnitude to the pressure therein, electromangetically operated means for actuating the movable wall, a light source having a beam extending across the path of travel of the movable wall, a light sensitive element responsive to light passing said moving wall, and a circuit coupled to the element for controlling the energy supplied to said actuating means.

7. An arrangement for measuring pressure comprising an envelope for communication with a source of pressure to be measured, a stationary and a swinging wall disposed within the envelope to produce damping corresponding to the pressure level in the envelope, electromagnetically operated means for actuating the swinging wall, a source of light extending normal to the path of travel of the swinging wall, means responsive to light from the source passing the swinging wall, a control circuit coupled to said light responsive means and responsive to signals therefrom for supplying power to said actuating means, and an integrator coupled to the control circuit for indicating pressure as a function of damping.

8. An arrangement for measuring pressure comprising an envelope for communication with a source of pressure to be measured, a stationary wall and a swinging wall disposed within the envelope in close proximity to each other to produce damping corresponding to pressure level, electromagnetically operated means for actuating the swinging wall, a shutter carried by the swinging wall, a light source having a beam extending across the path of travel of the shutter, a light sensitive element responsive to light passing the shutter, a control circuit coupled to said element and responsive to signals therefrom to control the power supplied to the actuating means, and means for adjusting the power from said circuit to maintain the amplitude of swing of said wall.

9. An arrangement for measuring pressure comprising an envelope for communication with a source of pressure to be measured, a stationary and a movable wall disposed within the envelope in close proximity to provide damping during movement corresponding in magnitude to the pressure therein, electromagnetically operated means for actuating the movable wall, a shutter on the movable wall, a source of light having a beam extending across the path of travel of the shutter, a light sensitive element responsive to light passing said source for producing signals, and a control circuit coupled to the element and responsive to signals therefrom for supplying uniform energy pulses to said actuating means, said control circuit including a phase shifter and limiter.

10. An arrangement for measuring pressure comprising an envelope for communication with a source of pressure to be measured, a stationary and a movable wall disposed within the envelope in close proximity to each other to produce damping during movement corresponding in magnitude to the pressure in the envelope, electromagnetically operated means for actuating the moving wall, a light source having a beam extending normal to the path of travel of the moving wall, a light sensitive element responsive to light passing said moving wall to produce signals, a control circuit including a phase shifter, amplifier and limiter for supplying said actuating means with uniform energy pulses, means for adjusting the output of said control circuit, and an indicator in the output of the control circuit for measuring current flow to the actuating means.

References Cited in the file of this patent

UNITED STATES PATENTS

| | | |
|---|---|---|
| 2,283,750 | Mikelson | May 19, 1942 |
| 2,358,374 | Ashcraft | Sept. 19, 1944 |
| 2,552,895 | Kuipers | May 15, 1951 |
| 2,745,278 | Roberts | May 15, 1956 |